United States Patent
Nakano

(10) Patent No.: US 9,677,248 B2
(45) Date of Patent: Jun. 13, 2017

(54) WORK VEHICLE

(71) Applicant: KOMATSU LTD., Tokyo (JP)

(72) Inventor: Yuichi Nakano, Komatsu (JP)

(73) Assignee: KOMATSU LTD., Tokyo (JP)

( * ) Notice: Subject to any disclaimer, the term of this patent is extended or adjusted under 35 U.S.C. 154(b) by 318 days.

(21) Appl. No.: 14/389,885

(22) PCT Filed: Aug. 25, 2014

(86) PCT No.: PCT/JP2014/072123
§ 371 (c)(1),
(2) Date: Oct. 1, 2014

(87) PCT Pub. No.: WO2016/030935
PCT Pub. Date: Mar. 3, 2016

(65) Prior Publication Data
US 2016/0258132 A1    Sep. 8, 2016

(51) Int. Cl.
*B60K 15/05* (2006.01)
*E02F 9/08* (2006.01)
(Continued)

(52) U.S. Cl.
CPC ............ *E02F 9/0891* (2013.01); *B60K 13/04* (2013.01); *B60K 15/05* (2013.01); *E02F 9/0883* (2013.01);
(Continued)

(58) Field of Classification Search
CPC .............. F01N 2340/04; B60K 15/05; B60K 2015/053; B60K 2015/0515
See application file for complete search history.

(56) References Cited

U.S. PATENT DOCUMENTS 4,361,354 A * 11/1982 Kemp, Jr. .............. B60K 15/05
                                                             292/338
4,395,070 A *  7/1983 Veltman ................ B60K 15/05
                                                              292/38
(Continued)

FOREIGN PATENT DOCUMENTS

CN      101195393 A    6/2008
JP       58-29130 U    8/1981
(Continued)

OTHER PUBLICATIONS

Office Action for the corresponding Chinese patent application No. 201480001237.X, issued on Jan. 27, 2016.
(Continued)

*Primary Examiner* — J. Allen Shriver, II
*Assistant Examiner* — Travis Coolman
(74) *Attorney, Agent, or Firm* — Global IP Counselors, LLP

(57) ABSTRACT

A work vehicle includes a tank, an exterior cover, an openable cover, and a hinge member. The tank has a replenishing port. The exterior cover covers the tank and includes an opening section in a portion facing the replenishing port. The openable cover covers the opening section. The hinge member is provided between a lower end of the openable cover and the exterior cover and allows rotation of the openable cover. A recessed section is formed on an upper part of the hinge member when the openable cover is opened.

13 Claims, 9 Drawing Sheets

(51) Int. Cl.
*B60K 13/04* (2006.01)
*E02F 3/76* (2006.01)

(52) U.S. Cl.
CPC *B60K 2015/053* (2013.01); *B60K 2015/0569* (2013.01); *B60Y 2200/411* (2013.01); *E02F 3/7609* (2013.01); *E02F 3/7622* (2013.01)

(56) References Cited

U.S. PATENT DOCUMENTS

| | | | | |
|---|---|---|---|---|
| 5,046,776 A | * | 9/1991 | Shaw | B60K 15/05 |
| | | | | 141/390 |
| 5,695,207 A | * | 12/1997 | Mouterde | B60R 3/02 |
| | | | | 280/163 |
| 5,718,471 A | * | 2/1998 | McHorse | B60K 15/05 |
| | | | | 141/86 |
| 5,769,260 A | * | 6/1998 | Killinger | A45C 13/005 |
| | | | | 220/4.23 |
| 6,938,928 B2 | * | 9/2005 | Pfohl | B60K 15/04 |
| | | | | 180/314 |
| 7,566,089 B2 | * | 7/2009 | Alfaro | B60K 15/05 |
| | | | | 280/853 |
| 8,695,827 B2 | * | 4/2014 | Klauer | B60K 13/04 |
| | | | | 141/369 |
| 8,820,289 B2 | * | 9/2014 | Green | F02M 21/0224 |
| | | | | 123/195 C |
| 9,027,688 B2 | * | 5/2015 | Okuda | B60K 13/04 |
| | | | | 180/89.2 |
| 9,233,722 B1 | * | 1/2016 | Bixby | B60R 3/00 |
| 9,255,382 B2 | * | 2/2016 | Noda | E02F 9/16 |
| 9,366,007 B2 | * | 6/2016 | Azuma | E02F 9/0833 |
| 2009/0078827 A1 | * | 3/2009 | Martin | B64C 1/24 |
| | | | | 244/129.6 |
| 2013/0071295 A1 | * | 3/2013 | Terakawa | E02F 9/0858 |
| | | | | 422/168 |

FOREIGN PATENT DOCUMENTS

| | | |
|---|---|---|
| JP | 2-23430 U | 2/1990 |
| JP | 3023287 U | 1/1996 |
| JP | 8-192647 A | 7/1996 |
| JP | 8-244784 A | 9/1996 |
| JP | 3035719 U | 1/1997 |
| JP | 2005-112146 A | 4/2005 |

OTHER PUBLICATIONS

The International Search Report for the corresponding international application No. PCT/JP2014/072123, issued on Nov. 4, 2014.
The International Written Opinion for the corresponding international application No. PCT/JP2014/072123, issued on Nov. 4, 2014.

* cited by examiner

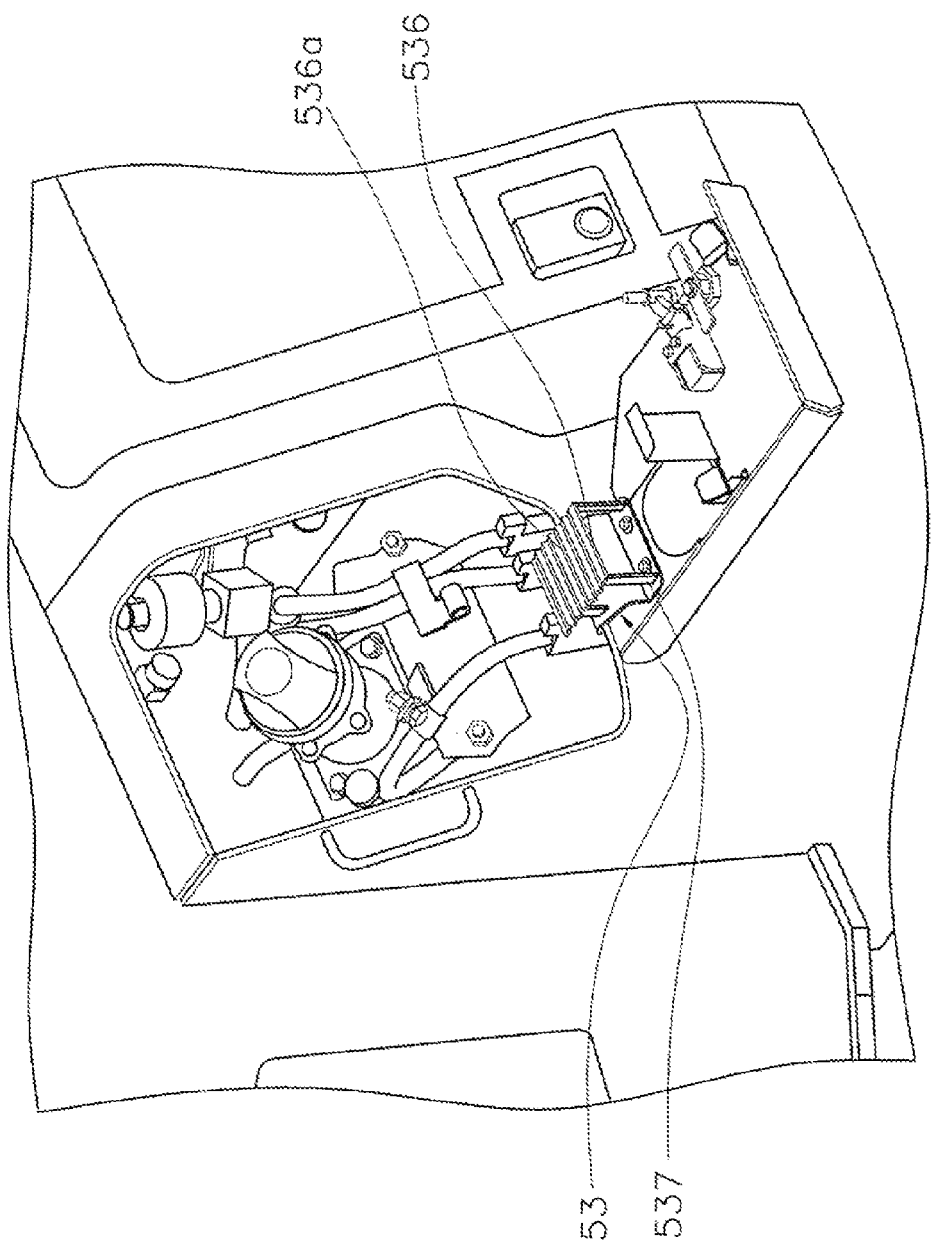

US 9,677,248 B2

WORK VEHICLE

CROSS-REFERENCE TO RELATED APPLICATIONS

This application is a U.S. National stage application of International Application No. PCT/JP2014/072123, filed on Aug. 25, 2014.

FIELD OF THE INVENTION

The present invention relates to a work vehicle.

BACKGROUND INFORMATION

Japanese Laid-open Patent Publication No. H08-192647 discloses a work vehicle provided with a fuel tank disposed inside a cover that covers a machine body and provided with an openable lid that covers a fuel supply opening section provided on the cover. The lid opens to the outside with the bottom end of the lid acting as a fulcrum to the extent to which the lid extends horizontally. The inside surface of the lid is provided with a positioning engagement section for positioning a portable fuel supply tank. After placing the portable fuel tank on the inside surface of the lid in the work vehicle, the lid can be tilted to supply the fuel.

Japanese Laid-open Patent No. 2005-112146 discloses an openable cover of a fuel tank disposed on the front surface side of a work vehicle, the cover being opened and closed when supplying fuel. A hinge is provided at the bottom end of the openable cover. When the openable cover is opened, the upper surface of the openable cover extends almost horizontally due to a stopper provided on the hinge. As a result, a polyurethane tank for supplying oil can be temporarily placed on the upper surface.

SUMMARY

In the invention according to Japanese Laid-open Patent Publication No. H08-192647, the positioning engagement section including a pair of front and back upright frames and a pair of upper and lower lateral frames needs to be provided on the openable cover and thus the structure of the lid is very complicated. In the invention according to Japanese Laid-open Patent No. 2005-112146, the back surface (upper surface of the openable cover when the openable cover is opened) of the openable cover must be shaped into a flat surface, and thus the structure of the openable cover is also complicated. Moreover, a replenishment container may slip easily when replenishing oil and the work of replenishing the oil is troublesome.

An object of the present invention is to provide a work vehicle with a simple structure which facilitates the replenishment of a liquid from a replenishment container.

A work vehicle according to a first embodiment of the present invention is provided with a tank, an exterior cover, an openable cover, and a hinge member. The tank has a replenishing port. The exterior cover covers the tank and includes an opening section in a portion facing the replenishing port. The openable cover covers the opening section. The hinge member is provided between a lower end of the openable cover and the exterior cover and allows the openable cover to be rotated. A recessed section is formed on an upper part of the hinge member when the openable cover is opened.

The hinge member may include at least one first plate member that extends perpendicular to the rotational axis of the openable cover. The recessed section may be formed on the first plate member.

The first plate member may include a plurality of recessed sections.

The hinge member may further include a second plate member. The recessed section may be formed on the second plate member. Alternatively, the second plate member may include the same number of recessed sections as the first plate member.

An upper end of the first plate member and an upper end of the second plate member may be positioned on the same horizontal plane when the openable cover is opened.

The openable cover may include a bend section in at least one end section of the openable cover. The upper end of the first plate member and an upper end of the bend section may be positioned on the same horizontal plane when the openable cover is opened.

The openable cover may further include a placing member provided on an inside surface of the openable cover. The upper end of the first plate member and an upper end of the placing member may be positioned on the same horizontal plane when the openable cover is opened. Alternatively, the upper end of the first plate member, the upper end of the bend section, and the upper end of the placing member may be positioned on the same horizontal plane when the openable cover is opened.

The hinge member is provided between the lower end of the openable cover and the exterior cover, and the recessed section is formed on the hinge member when the openable cover is opened in the work vehicle according to the present invention. Therefore, a work vehicle can have a simple structure that facilitates the replenishment of a liquid from a replenishment container.

BRIEF DESCRIPTION OF DRAWINGS

FIG. 9 illustrates a second modified example of the hinge member.

DESCRIPTION OF EMBODIMENT(S)

Configuration

Figure 1:
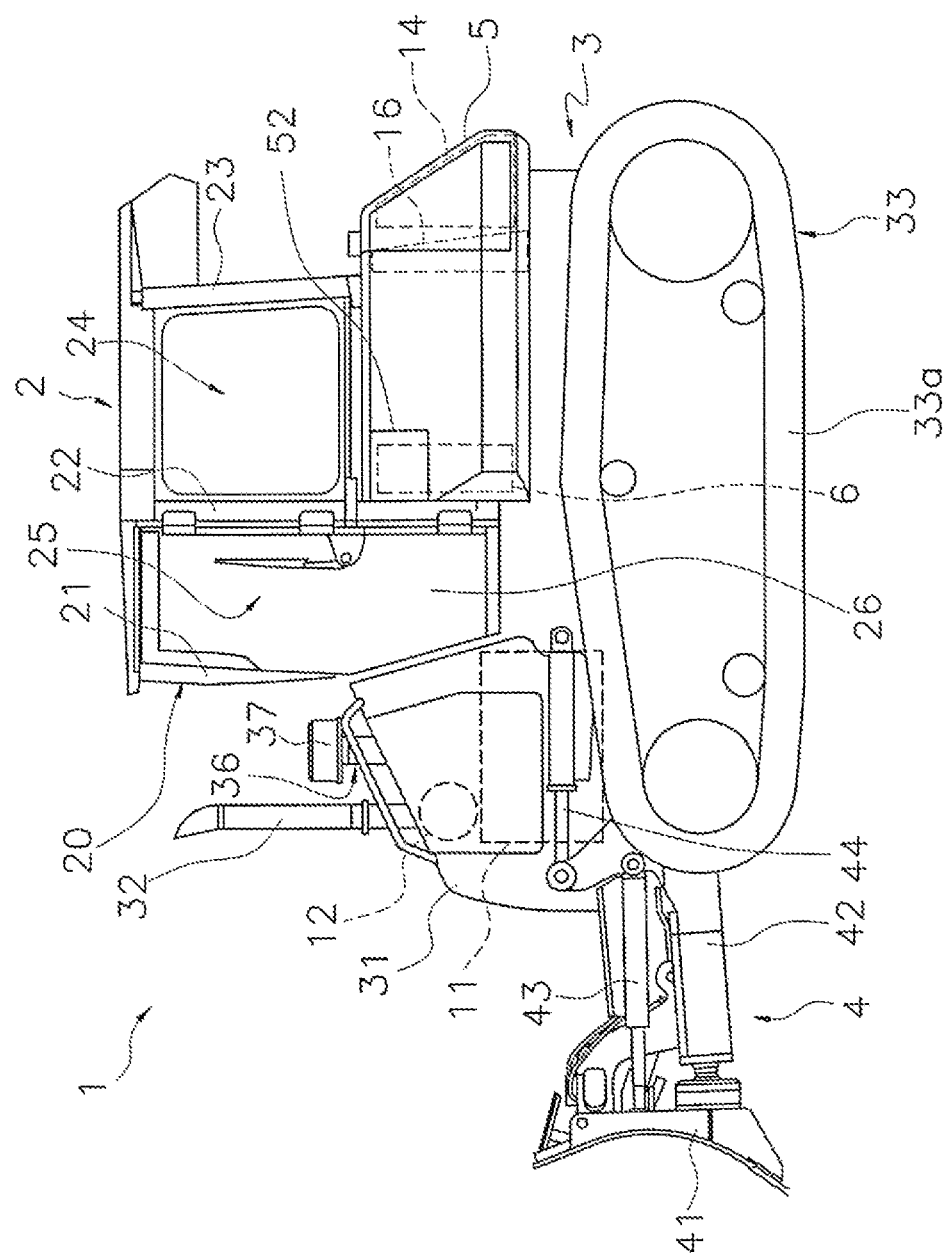
FIG. 1 is a side view of the work vehicle.
Figure 2:
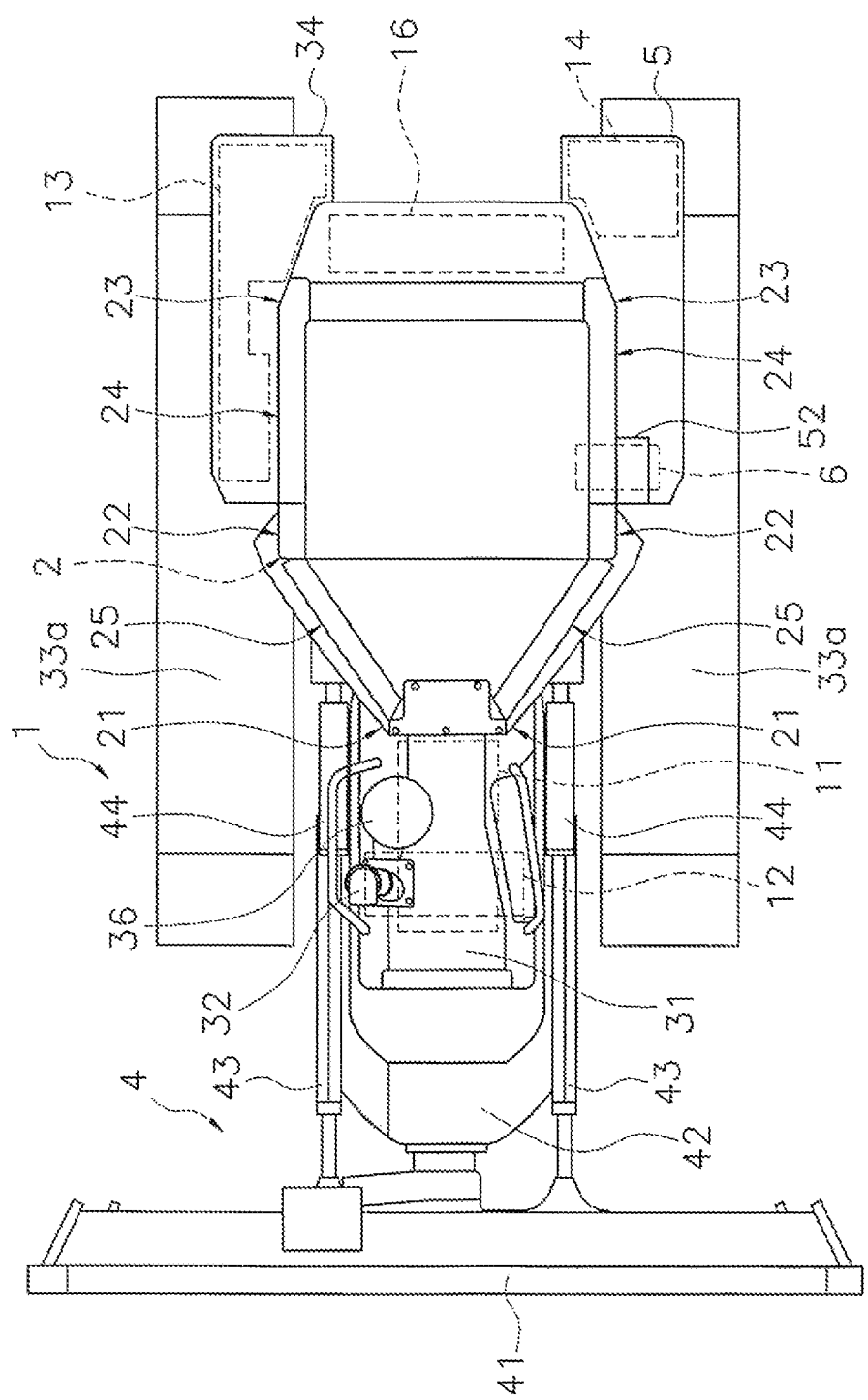
FIG. 2 is a top view of the work vehicle.

A work vehicle 1 according to a first embodiment of the present invention is illustrated in FIG. 1 and FIG. 2. FIG. 1 is a side view of the work vehicle 1 and FIG. 2 is a top view of the work vehicle 1. While a bulldozer is depicted as the work vehicle 1 in FIGS. 1 and 2, the work vehicle 1 may be another work vehicle such as a hydraulic excavator, a wheel loader, a motor grader, or a dump truck and the like. The work vehicle 1 comprises a cab 2, a main vehicle body 3, and a working implement 4. In the following explanations, the front-back direction signifies the front-back direction of the work vehicle 1. In other words, the front-back direction signifies the front-back direction as seen from an operator sitting in the cab 2. Moreover, the left-right direction signifies the left-right direction as seen from an operator sitting in the cab 2. Toward the side signifies the vehicle width direction of the work vehicle 1, that is, either the aforementioned left direction or the right direction.

(Cab 2)

The cab 2 contains a seat in which the operator of the work vehicle 1 sits, levers for various operations, and pedals and various gauges. The cab 2 has a rollover protective structure (ROPS) and is disposed on the main vehicle body 3.

The cab 2 has a pair of A pillars 21, a pair of B pillars 22, and a pair of C pillars 23 disposed in order from the front. The pillars 21 to 23 are spaced away from each other in the left-right direction and extend in the vertical direction. The pair of B pillars 22 and the pair of C pillars 23 are disposed away from each other at approximately the same interval. A pair of rear side surfaces 24 that connect the B pillars 22 and the C pillars 23 are disposed approximately parallel to each other. Conversely, the pair of A pillars 21 are disposed away from each other with an interval that is less than that of the pair of B pillars 22. A pair of front side surfaces 25 that connect the A pillars 21 and the B pillars 22 are disposed so that the interval in the left-right direction decreases further toward the front. The front side surfaces 25 are connected by being inclined toward the front surface of the cab 2. The cab 2 has a tapered shape in which the width in the left-right direction is smaller at the front surface side. An entrance of the operator is provided in the front side surfaces 25 and has a door 26 attached thereto. A front window 20 which allows the operator inside the cab 2 to be able to see forward is provided in an upper half on the front surface of the cab 2.

(Main Vehicle Body 3)

The main vehicle body 3 includes an engine hood 31, an exhaust pipe 32, left and right travel devices 33, a first housing section 5, a second housing section 34, and a main frame (not illustrated) for supporting the aforementioned members.

The engine hood 31 is provided in front of the cab 2. The upper surface of the engine hood 31 slopes down to the front. The rear end section of the upper surface of the engine hood 31 is connected to the bottom end of the front window 20 of the cab 2. An opening through which an air intake port of an air cleaner 36 and the exhaust pipe 32 penetrate is provided in the upper surface of the engine hood 31.

The main vehicle body 3 includes an engine 11 and a selective catalytic reduction device 12 inside the engine hood 31. That is, the engine 11 and the selective catalytic reduction device 12 are disposed inside the engine hood 31. The engine 11 is, for example, a diesel engine and generates driving power for driving the travel devices 33 and working implement pumps (not illustrated) and the like. The selective catalytic reduction device 12 treats exhaust from the engine 11 with a reducing agent. The selective catalytic reduction device 12 selectively reduces nitrogen oxides NOx. The reducing agent is, for example, aqueous urea in the present embodiment. When the reducing agent is aqueous urea, the aforementioned selective catalytic reduction device 12 includes a pipe for injecting the aqueous urea into the exhaust gas to initiate hydrolysis in the exhaust gas to obtain ammonia gas.

The exhaust pipe 32 is a pipe for discharging into the outside, the exhaust gas that has been treated by the selective catalytic reduction device 12 from the engine 11. The exhaust pipe 32 is provided so as to protrude upward from the upper surface of the engine hood 31. The upper end of the exhaust pipe 32 extends upward to about a height of the upper surface of the cab 2. The exhaust pipe 32 is provided eccentrically toward one side from the center in the left-right direction of the engine hood 31. The exhaust pipe 32 is provided in a standing manner at a position in line with the right side A pillar among the pair of A pillars 21 as seen from the rear, that is, as seen from the operator inside the cab 2. As a result, deterioration of the forward visibility of the operator inside the cab 2 due to the exhaust pipe 32 is prevented. A head section 37 of the air cleaner 36 is disposed behind the exhaust pipe 32.

The travel devices 33 are attached on the left and right sides of the main frame. The travel devices 33 have a crawler belt 33a. The work vehicle 1 travels due to the rotation of the crawler belts 33a which are wrapped onto the top and bottom of a plurality of wheels.

The first, housing section 5 is attached to a first side at the rear section of the cab 2. While FIGS. 1 and 2 depict the left side as the first side, the first side may also be the right side. The main vehicle body 3 includes a reducing agent tank 6 and a hydraulic fluid tank 14 inside the first housing section 5. That is, the reducing agent tank 6 and the hydraulic fluid tank 14 are stored in the first housing section 5. The hydraulic fluid tank 14 stores hydraulic fluid to be supplied to a gear system and to a working implement 4 system. The hydraulic fluid tank 14 is provided at the rear end of the first housing section 5. The reducing agent tank 6 stores reducing agent to be used in the selective catalytic reduction device 12. The reducing agent is supplied to the selective catalytic reduction device 12. The reducing agent tank 6 includes on an upper surface thereof a replenishing port 61 that extends upward and toward the side (see FIG. 3 and FIG. 5).

The second housing section 34 is attached to a second side that is on the opposite side of the first side at the rear section of the cab 2. The main vehicle body 3 includes a fuel tank 13 inside the second housing section 34. That is, the fuel tank 13 is stored in the second housing section 34. The fuel rank 13 stores fuel to be supplied to the engine 11.

An engine cooling module 16 is provided in the main vehicle body 3 behind the cab 2 and between the left and right first housing section 5 and the second housing section 34. The engine cooling module 16 is disposed forwards of rear ends of a cover of the first housing section 5 and a cover of the second housing section 34. Consequently, the engine cooling module 16 is protected from external obstacles and it is easy to check the state of work to the rear by looking to the rear from the cab 2 over the engine cooling module 16. As a result, when a ripper or winch is attached to the rear section of the work vehicle 1, it is possible to operate the work by checking the rear working implement from the cab 2 over the engine cooling module 16.

The engine cooling module 16 includes, for example, a radiator, a fan, and a motor. The engine cooling module 16 causes the motor to rotate the fan and cools the coolant flowing in the radiator to cool the engine 11.

(Working Implement 4)

The working implement 4 includes a blade 41, an arm member 42, and hydraulic cylinders 43 and 44. The blade 41 is provided in front of the engine hood 31. The blade 41 has a width that is greater than that of the cab 2 in the left-right direction. When the lower end section of the blade 41 is in contact with the ground, the upper end section of the blade 41 is positioned below the upper surface of the engine hood 31, and the upper surface of the engine hood 31 is positioned below a virtual line that connects the upper end section of the blade 41 and the upper end section of the front surface of the cab 2. The arm member 42 supports the working implement 4. One end of the arm member 42 is connected to the main vehicle body 3 and the other end of the arm member 42 is connected to the blade 41. The hydraulic cylinders 43 and 44 are hydraulic actuators for moving and tilting the blade 41 in a desired direction by extending and contracting.

(Detailed Structure of First Housing Section 5)

Figure 3:
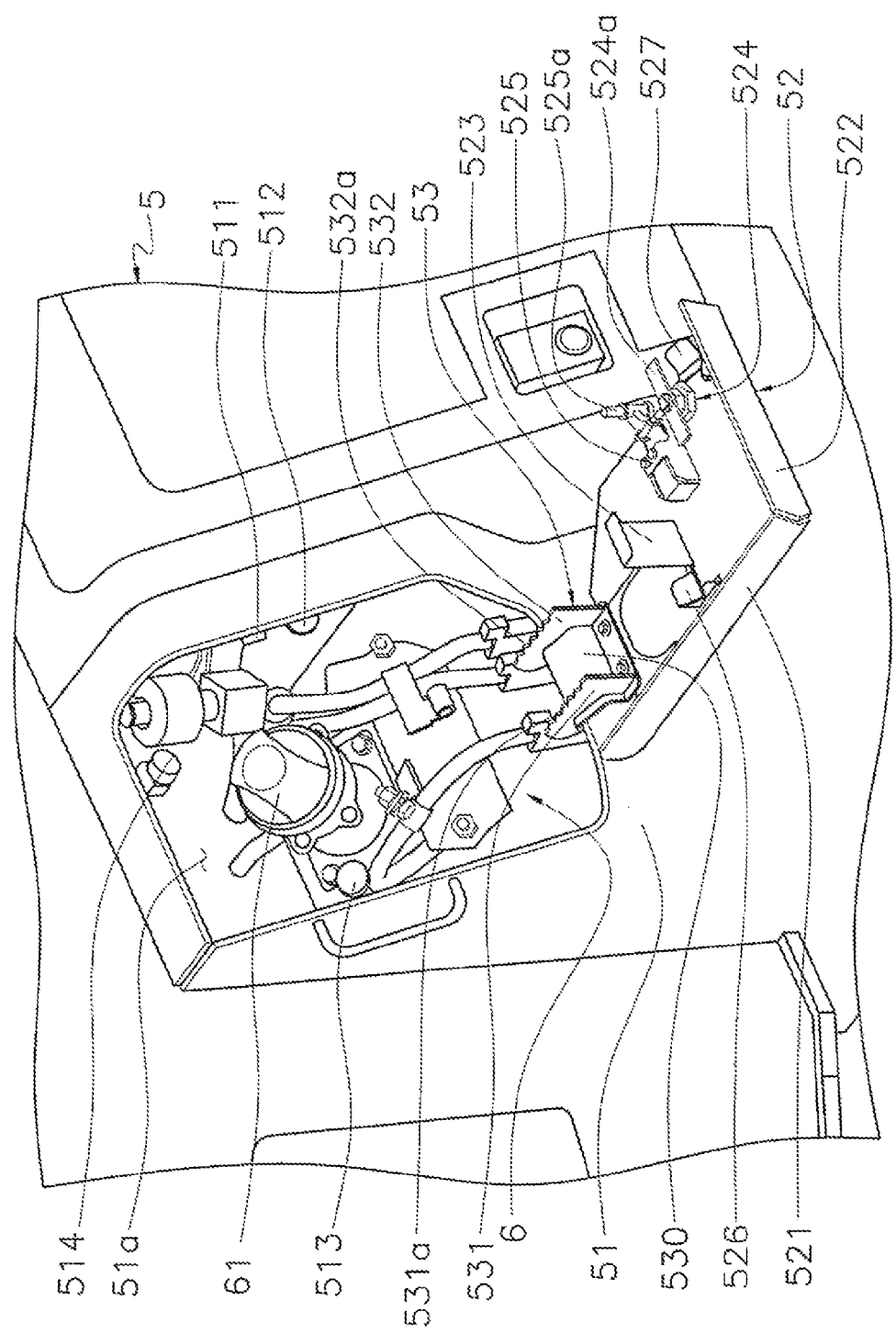
FIG. 3 is an enlarged perspective view of an openable cover and an opening section of an exterior cover in the vicinity of a reducing agent tank.
Figure 5:
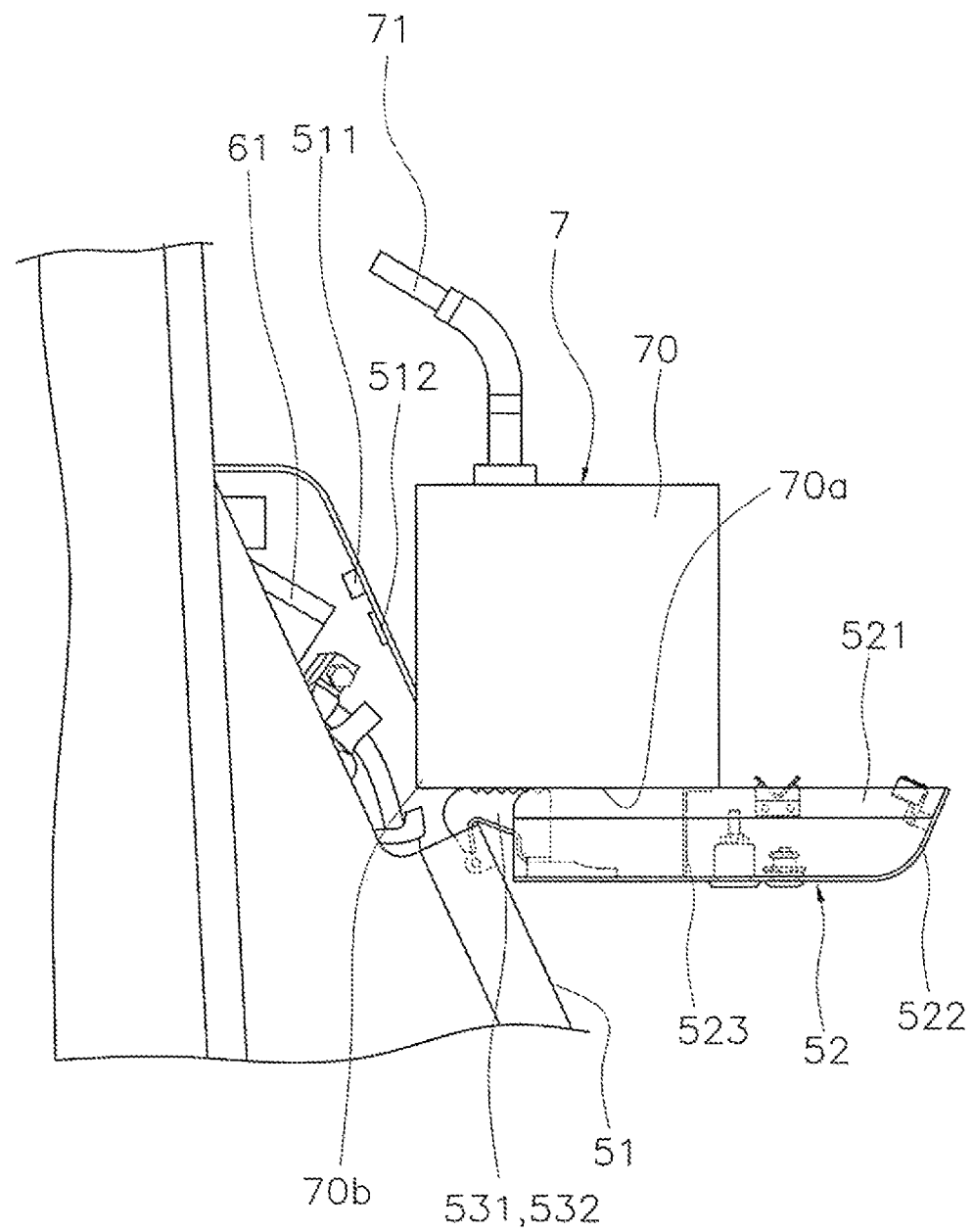
FIG. 5 illustrates an example of a state in which a replenishment container is placed on the openable cover as seen from the front.

As can be seen in FIG. 3, the first housing section 5 includes an exterior cover 51, an openable cover 52, and a hinge member 53. As illustrated in FIG. 3, the exterior cover 51 covers the reducing agent tank 6 and has an opening section 51a in a portion that faces the replenishing port 61 of the reducing agent tank 6. The openable cover 52 covers the opening section 51a. As illustrated in FIGS. 3 and 5, the hinge member 53 is provided between the lower end of the openable cover 52 and the exterior cover 51, and allows the openable cover 52 to rotate.

Figure 4:
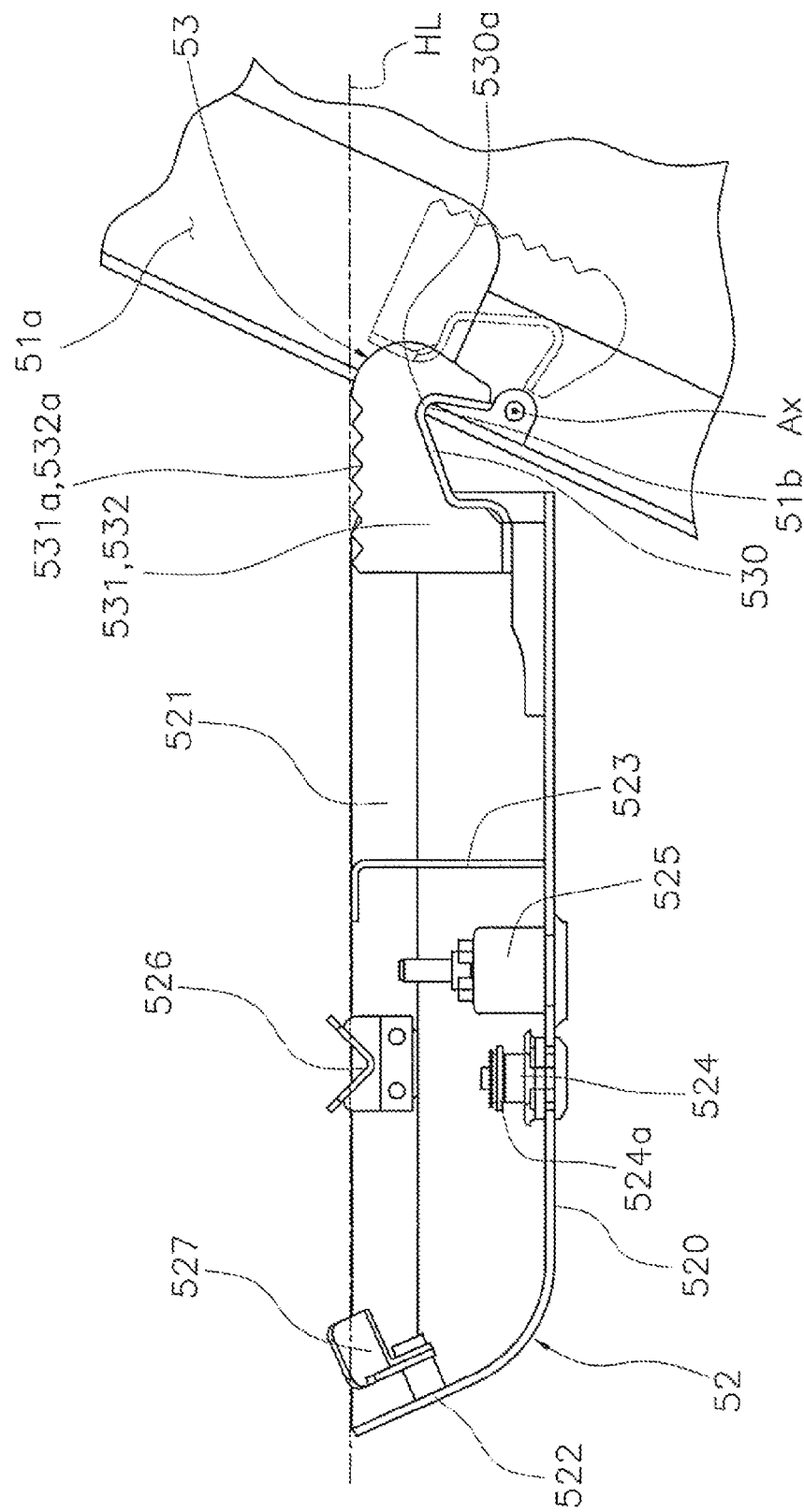
FIG. 4 illustrates the openable cover in an opened state from the rear of the vehicle.

As illustrated in FIGS. 3 and 4, the hinge member 53 includes abase member 530, a first plate member 531 and a second plate member 532. The first plate member 531 and the second plate member 532 extend in a direction perpendicular to the base member 530 and act as ribs of the base member 530. The first plate member 531 and the second plate member 532 are approximately parallel and are spaced apart in the vehicle front-back direction. Furthermore, the first plate member 531 and the second plate member 532 extend in the left-right direction while the openable cover 52 is opened. That is, as can be seen in FIG. 4, the first plate member 531 and the second plate member 532 extend in a direction perpendicular to the rotational axis Ax of the binge member 53. The position of the hinge member 53 when the openable cover 52 is closed is depicted in FIG. 4 by the chain double-dashed line.

The first plate member 531 and the second plate member 532 include recessed sections 531a and 532a, respectively. That is, the hinge member 53 includes the recessed sections 531a and 532a. In other words, the recessed sections 531a and 532a are respectively formed on the first plate member 531 and the second plate member 532. The recessed sections 531a and 532a are formed in the upper ends of the first plate member 531 and the second plate member 532 when the openable cover 52 is opened. That is, the recessed sections 531a and 532a are formed on the upper side of the hinge member 32 when the openable cover 52 is opened. The first plate member 531 and the second plate member 532 desirably include a plurality of recessed sections 531a and 532a respectively. However, the first plate member 531 and the second plate member 532 may respectively include at least one recessed section 531a and 532a. The number of the recessed sections 531a on the first plate member 531 and the number of recessed sections 532a on the second plate member 532 are preferably the same.

The base member 530 is a rectangular plate-shaped member and has a bent shape. The base member 530 has a stopper 530a. The stopper 530a comes into contact with a lower end boundary 51b of the opening section 51a when the openable cover 52 is opened. The position/shape of the stopper 530a and the positions of the upper ends of the first plate member 531 and the second plate member 532 are adjusted so that the upper ends of the first plate member 531 and the second plate member 532 (depicted by the chain line HL in FIG. 4) become approximately horizontal when the openable cover 52 is opened, although the exterior cover 51 slopes down toward the first side. That is, the upper ends of the first plate member 531 and the second plate member 532 are positioned on the same horizontal plane when the openable cover 52 is opened. The first plate member 531 and the second plate member 532 are thin plates and have flat planes that extend in the direction perpendicular to the rotational axis of the openable cover 52. First sides of edge portions that extend in the longitudinal direction of the first plate member 531 and the second plate member 532 has shapes that follow the bent shape of the base member 530 and are attached to the base member 530. Second sides (side opposite the first side) of edge portions of the first plate member 531 and the second plate member 532 are provided with the recessed sections 531a and 532a.

The openable cover 52 includes a base section 520, a front end bend section 521, an outer end bend section 522, a placing member 523, a lock section 524, an adjustable handle 525, a first regulating section 526, and a second regulating section 527. The base section 520, the front end bend section 521, and the outer end bend section 522 are formed from one plate-shaped member. The front end bend section 521 is bent from the base section 520 so that the upper end of the front end bend section 521 is approximately horizontal when the openable cover 52 is opened. The outer end bend section 522 is bent from the base section 520 so that the upper end of the outer end bend section 522 is approximately horizontal when the openable cover 52 is opened. That is, the upper ends of the first plate member 531, the second plate member 532, the front end bend section 521, and the outer end bend section 522 are positioned on the same horizontal plane when the openable cover 52 is opened. The front end bend section 521 is provided on the front end section in the vehicle front-back direction of the base section 520. The outer end bend section 522 is provided on the outer end section (the end section of the base section 520 furthest away from the hinge member 53) of the base section 520. Therefore, the openable cover 52 includes a bend section in at least one end section of the openable cover 52.

The placing member 523 extends from the base section 520 in a direction perpendicular to the base section 520. That is, the placing member 523 extends upward from the base section 520 when the openable cover 52 is opened. The placing member 523 is provided on the inside surface (the surface facing the inside of the work vehicle 1 when the openable cover 52 is closed) of the openable cover 52. The placing member 523 is fixed by welding to the base section 520. The placing member 523 has an inverse L-shape and the upper end of the placing member 523 is approximately horizontal when the openable cover 52 is opened. The tipper ends of the first plate member 531, the second plate member 532, and the placing member 523 are positioned on the same horizontal plane when the openable cover 52 is opened. That is, the upper ends of the first plate member 531, the second plate member 532, the front end bend section 521, the outer end bend section 522, and the placing member 523 are positioned on the same horizontal plane when the openable cover 52 is opened.

The lock section 524 includes a latch section 524a that can rotate. The latch section 524a rotates by inserting a key into a keyhole outside the openable cover 52 and rotating the key. When the latch section 524a is rotated in a predetermined direction after the openable cover 52 is closed, the latch section 524*a* comes into contact with a first receptacle 511 (see FIGS. 3 and 5). The first receptacle 511 is provided near the outer periphery of the opening section 51*a* and is attached to the inside surface of the exterior cover 51. Consequently, the openable cover 52 can be locked.

The adjustable handle 525 includes a button and an opening/closing handle (not illustrated) positioned outside the openable cover 52. Furthermore, the adjustment handle 525 includes a locking member 525*a* positioned inside the openable cover 52. The locking member 525*a* is for example a bolt. The opening/closing handle opens toward the outside of the openable cover when the button is pressed and the lock is released in the adjustment handle 525. A worker is able to open the openable cover by holding the opened opening/closing handle. The adjustment handle 525 is locked when the openable cover 52 is closed and the opening/closing handle is stored in a hollow (not illustrated) provided outside the openable cover 52. The locking member 525*a* comes into contact with a second receptacle 512 at this time. The second receptacle 512 is provided near the outer periphery of the opening section 51*a* and is attached to the inside surface of the exterior cover 51. FIG. 3 depicts an orientation of the locking member 525*a* when the adjustment handle 525 is locked. When the adjustment handle 525 is to be unlocked, the locking member 525*a* is turned so as to move away from the outer periphery of the opening section 51*a*. The locking member 525*a* is turned in the anticlockwise direction as seen from the side of the work vehicle 1 in the example in FIG. 3. Consequently, the locking member 525*a* is moved away from the second receptacle 512.

The first regulating section 526 and the second regulating section 527 are respectively fixed to the front end bend section 521 and to the outer end bend section 522, respectively. The first regulating section 526 comes into contact with a first elastic member 513 when the openable cover 52 is closed. The first elastic member 513 is provided near the front end of the opening section 51*a* and is attached to the inside surface of the exterior cover 51. The second regulating section 527 comes into contact with a second elastic member 514 when the openable cover 52 is closed. The second elastic member 514 is provided near the upper end of the opening section 51*a* in the vehicle front-back direction and is attached to the inside surface of the exterior cover 51. The first elastic member 513 and the second elastic member 514 are made of rubber for example. The first regulating section 526 and the second regulating section 527 have V-shaped plate-shaped members. Movement of the openable cover 52 in the vertical direction is limited by the first regulating section 526 coming into contact with the first elastic member 513 so as to be sandwiched in the vertical direction. Movement of the openable cover 52 in the vehicle front-back direction is limited by the second regulating section 527 coming into contact with the second elastic member 514 so as to be sandwiched in the vehicle front-back direction. The V-shaped plate-shaped members of the first regulating section 526 and the second regulating section 527 protrude from the upper ends of the front end bend section 521 and the outer end bend section 522 when the openable cover 52 is opened as can be seen in FIG. 4. However, the first regulating section 526 and the second regulating section. 527 may be configured so that the V-shaped plate-like members thereof are positioned below the upper ends of the front end bend section 521 and the outer end bend section 522 when the openable cover 52 is opened.

Figure 6:
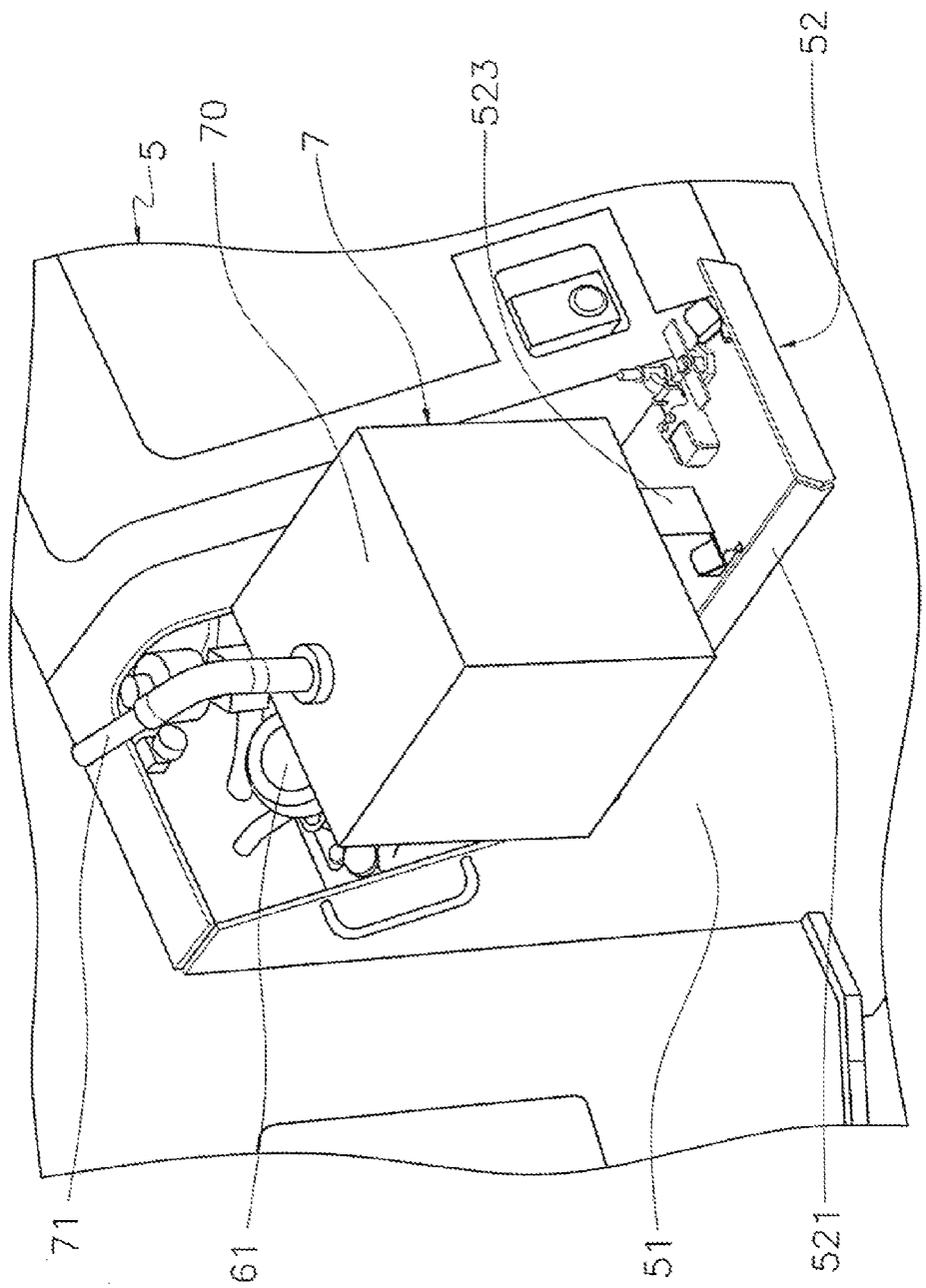
FIG. 6 illustrates an example of a state in which a replenishment container is placed on the openable cover as seen diagonally from the front.

FIGS. 5 and 6 illustrate a state in which a replenishing container is placed on the openable cover 52. The replenishing container 7 includes a container body 70 and a nozzle 71 that extends from the container body. The nozzle 71 includes a bellows-formed portion. The container body 70 is filled with a reducing agent. The container body 70 is covered by cardboard. Herein, the reducing agent container including the cardboard is referred to as the container body 70. As illustrated in FIGS. 5 and 6, the upper ends of the first plate member 531, the second plate member 532, the front end bend section 521, and the placing member 523 when the openable cover 52 is opened are positioned on the same horizontal plane whereby a flat bottom section 70*a* of the container body 70 can be placed on the upper ends of the first plate member 531, the second plate member 532, the front end bend section 521, and the placing member 523.

Figure 7:
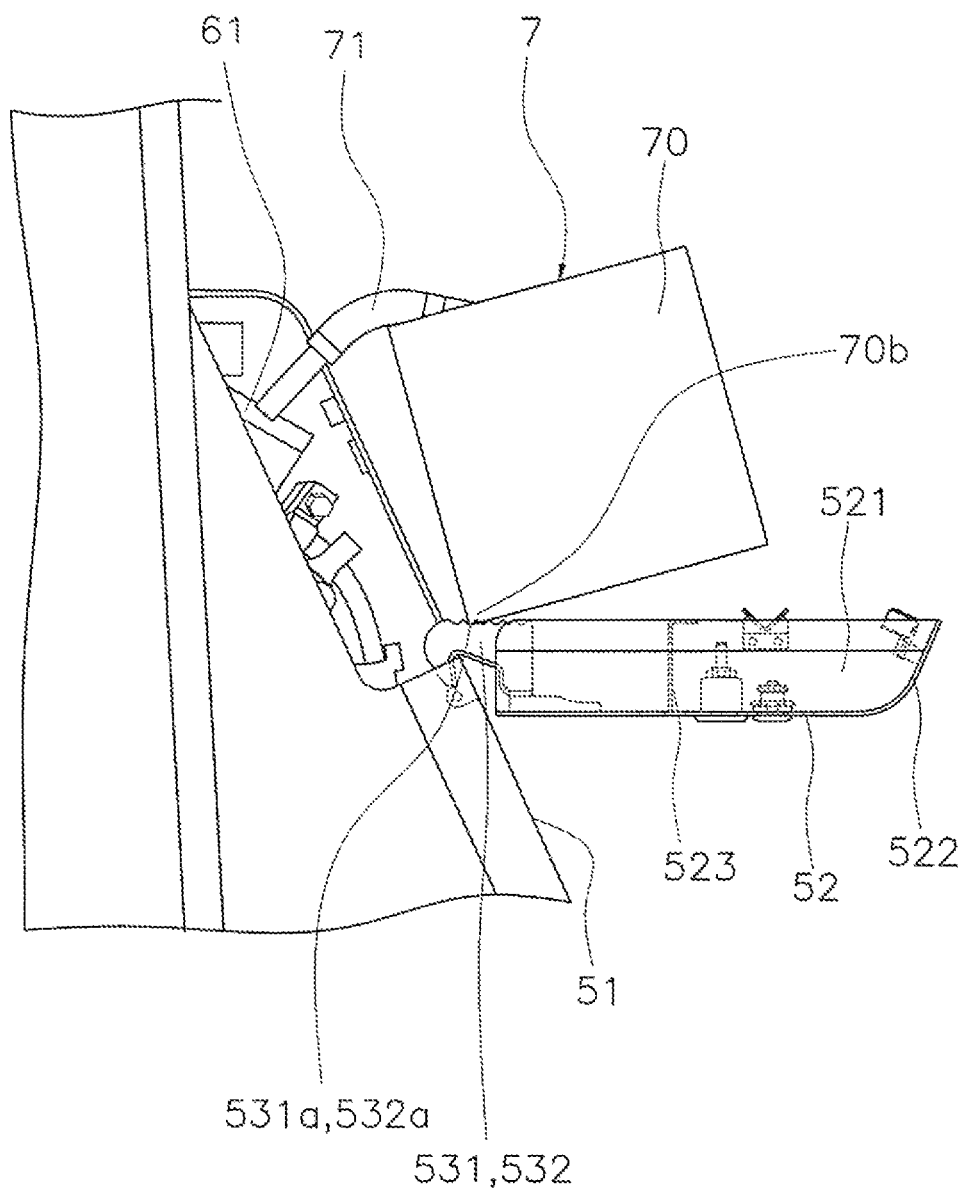
FIG. 7 illustrates an example of a state in which reducing agent is being replenished from the replenishment container to a replenishing port of the reducing agent tank as seen from the front.

FIG. 7 illustrates an example of a state in which reducing agent is being replenished from the replenishing container 7 to a replenishing port of the reducing agent tank. In order to insert the nozzle 71 into the replenishing port of the reducing agent tank 6, the container body 70 needs to be tilted because the nozzle 71 is short. However, the nozzle 71 can be easily inserted into the replenishing port 61 by wedging a bottom section front end 70*b* of the container body 70 into the recessed sections 531*a* and 532*a* and tilting the container body 70 with the recessed sections 531*a* and 532*a* acting as fulcrum. Thus the replenishment of a liquid from the replenishing container 7 is facilitated.

The replenishing container 7 is not limited to the containers depicted in FIGS. 5 to 7 and other containers with different capacities exist. In such a case, the recessed sections 531*a* and 532*a* can be selected according to the size of the container body 70 whereby the nozzle 71 can be inserted into the replenishing port 61 easily even with other containers.

(Features)

The work vehicle 1 according to the present embodiment has the following features.

The recessed sections 531*a* and 532*a* are formed on the upper part of the hinge member 53 when the openable cover 52 is opened. Accordingly, the nozzle 71 can be easily inserted into the replenishing port 61 by wedging the bottom section front end 70*b* of the container body 70 into the recessed sections 531*a* and 532*a* and tilting the container body 70 with the recessed sections 531*a* and 532*a* acting as fulcrums. Thus the replenishment of a liquid from the replenishing container 7 is facilitated.

(2) The recessed section 531*a* is formed in the first plate member 531. Alternatively, the recessed section 532*a* is formed in the second plate member 532. Therefore, the strength of the hinge member 53 is improved and forming the recessed sections is easy.

(3) The first plate member 531 includes a plurality of recessed sections 531*a*. Alternatively, the second plate member 532 includes a plurality of recessed sections 532*a*. Accordingly, the replenishment of liquid is facilitated for replenishing containers 7 with various capacities.

(4) The hinge member 53 includes the first plate member 531 and the second plate member 532. Accordingly, the replenishing container 7 can be supported in a stable manner even if the first plate member 531 and the second plate member 532 are thin.

(5) The number of the recessed sections 531*a* on the first plate member 531 and the number of recessed sections 532*a* on the second plate member 532 are the same. Accordingly, the recessed section 531*a* and the recessed section 532*a* can be selected corresponding to the various capacities of the replenishing containers 7, and the bottom section front end 70b of the replenishing container 7 is wedged into the selected recessed section and replenishing of the liquid can be performed.

(6) The upper end of the first plate member 531 and the upper end of the second plate member 532 are positioned on the same horizontal plane when the openable cover 52 is opened. Therefore, the replenishing container 7 can be placed in a stable manner even on the first plate member 531 and the second plate member 532.

(7) The openable cover 52 includes the front end bend section 521 in at least one end portion, and when the openable cover 52 is opened, the upper end of the first plate member 531 and/or the second plate member 532 and the upper end of the front end bend section 521 may be positioned, on the same horizontal plane. Accordingly, the replenishing container 7 can be placed in a stable manner on the openable cover 52.

(8) The openable cover 52 further includes the placing member 523 provided on the inside surface of the openable cover 52. The upper end of the first plate member 531 and/or the second plate member 532, and the upper end of the placing member 523 are positioned on the same horizontal plane when the openable cover 52 is opened. Accordingly, the replenishing container 7 can be placed in a stable manner on the openable cover 52.

(9) The upper end of the first plate member 531 and/or the second plate member 532, the upper end of the front bend section 521, and the upper end of the placing member 523 are positioned on the same horizontal plane when the openable cover 52 is opened. Accordingly, the position of the replenishing container 7 is supported in three or more different locations. Therefore, the replenishing container 7 can be placed in a more stable manner on the openable cover 52.

Modified Examples

Although an embodiment of the present invention has been described so far, the present invention is not limited to the above embodiments and various modifications may be made within the scope of the invention.

Regarding the first plate member 531 and the second plate member 532 in the above embodiment, the member 531 may be used as the second plate member and the member 532 may be used as the first plate member. Further, the hinge member 53 may include three or more plate-shaped members that include the above recessed sections.

Figure 8:
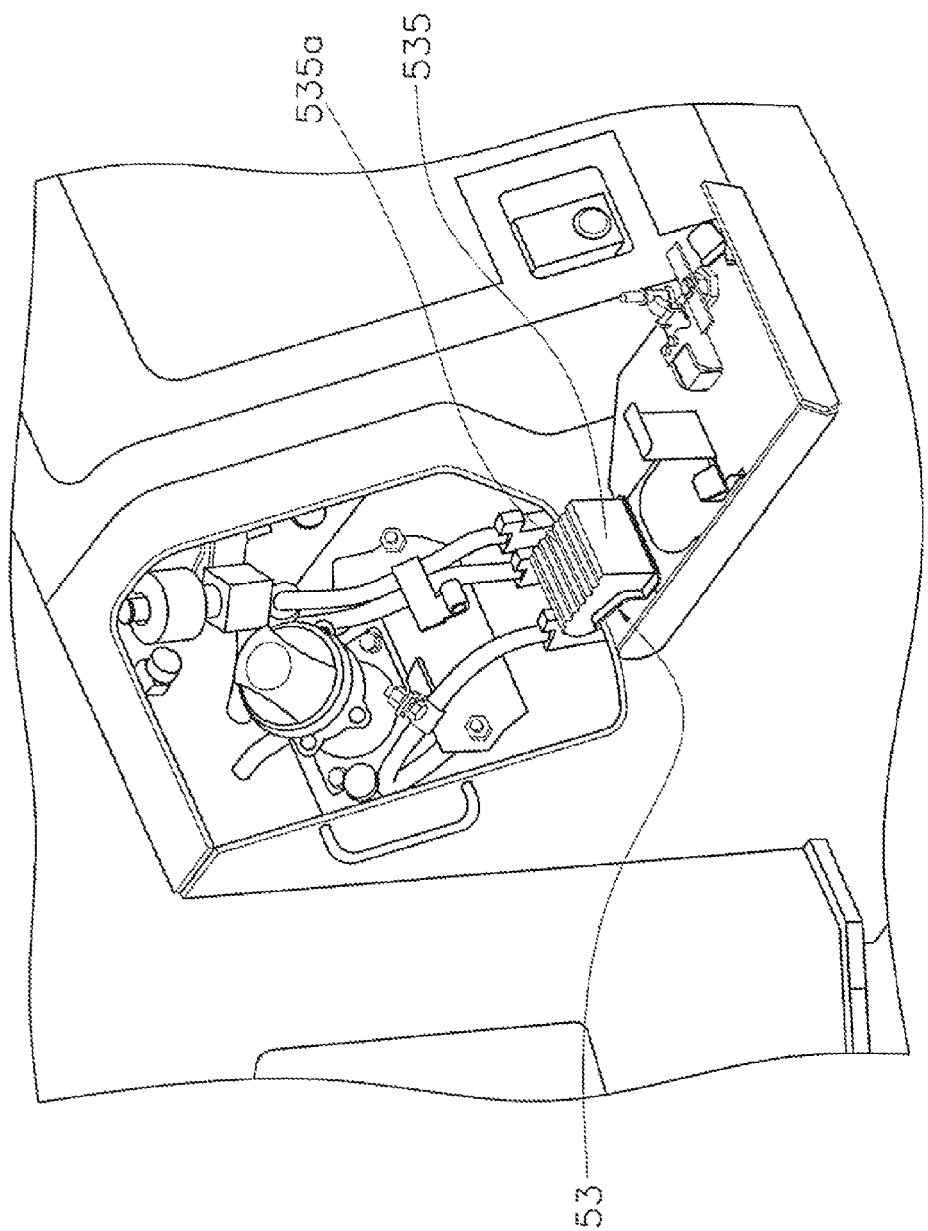
FIG. 8 illustrates a first modified example of the hinge member.

As illustrated in FIG. 8, the hinge member 53 may include one reinforcing member 535, and the reinforcing member 535 may include a recessed section 535a.

As illustrated in FIG. 9, the hinge member 53 may be configured so that a recessed section 536a is formed by one bent member 536 bent by machining, and the bent member 536 may be supported by a plurality of column members 537.

Furthermore, the hinge member 53 may include recessed sections formed by aligning a plurality of column members in a row. Alternatively, the recessed sections may be formed by machining the base member 530.

While the recessed sections 531a and 532a are respectively formed in a saw-like shape on the first plate member 531 and the second plate member 532 in the above embodiment, only one recessed section 531a and one recessed section 532a may be formed respectively on the first plate member 531 and the second plate member 532. Alternatively, the recessed sections 531a and 532a may be formed on the first plate member 531 and second plate member 532 as a number that corresponds to a type of the replenishing container 7. The number of the recessed sections 531a on the first plate member 531 and the number of recessed sections 532a on the second plate member 532 are not necessarily the same.

The front end bend section 521, the outer end bend section 522, the placing member 523, the lock section 524, the adjustable handle 525, the first regulating section 526, the second regulating section 527, the first receptacle 511, the second receptacle 512, the first elastic member 513, and the second elastic member 514 may be omitted as appropriate. Alternatively, the mounting positions of the above members may be changed. For example, in place of the front end bend section 521, a bent section on which the flat bottom section 70a of the container body 70 can be placed may be provided on the rear end.

The placing member 523 is not limited to the shape described in the above embodiment and may have another shape such as a U-shape, a rectangular solid shape, or a columnar shape. The method for fixing the placing member 523 and the base section 520 is not limited to welding and may be another method such as a bolt and nut.

The front end bend section 521 and the outer end bend section 522 are not limited to being formed by bending from the base section 520 and may be formed by welding and the like. The front end bend section 521 and the outer end bend section 522 are not limited to the shapes depicted in the above embodiment and may be formed as plates that extend in a perpendicular manner from the base section 520.

The container body 70 of the replenishing container 7 may not be covered by cardboard.

INDUSTRIAL APPLICABILITY

According to the present invention, a work vehicle is provided in which the replenishment of a liquid from a replenishing container is facilitated with a simple structure.

The invention claimed is:
1. A work vehicle comprising:
a tank including a replenishing port;
an exterior cover covering the tank, the exterior cover including an opening section in a portion facing the replenishing port;
an openable cover covering the opening section; and
a hinge member provided between a lower end of the openable cover and the exterior cover, the hinge member allowing the openable cover to be rotated, the hinge member including a first plate member extending perpendicular to a rotational axis of the openable cover, a plurality of first recessed sections being formed on an upper part of the first plate member when the openable cover is opened.
2. The work vehicle according to claim 1, wherein the hinge member further includes a second plate member, the at least one second recessed section being formed on the second plate member.
3. The work vehicle according to claim 2, wherein the second plate member includes a number of the second recessed sections equal to a number of the first recessed sections of the first plate member.
4. The work vehicle according to claim 3, wherein an upper end of the first plate member and an upper end of the second plate member are positioned on a common horizontal plane when the openable cover is opened.

5. The work vehicle according to claim 2, wherein
an upper end of the first plate member and an upper end of the second plate member are positioned on a common horizontal plane when the openable cover is opened.

6. The work vehicle according to claim 1, wherein
the openable cover includes a bend section in at least one end section of the openable cover; and
an upper end of the first plate member and an upper end of the bend section are positioned on a common horizontal plane when the openable cover is opened.

7. The work vehicle according to claim 6, wherein
the openable cover further includes a placing member provided on an inside surface of the openable cover; and
the upper end of the first plate member, the upper end of the bend section, and an upper end of the placing member are positioned on the common horizontal plane when the openable cover is opened.

8. The work vehicle according to claim 1, wherein
the openable cover further includes a placing member provided on an inside surface of the openable cover; and
an upper end of the first plate member and an upper end of the placing member are positioned on a common horizontal plane when the openable cover is opened.

9. A work vehicle comprising:
a tank including a replenishing port;
an exterior cover covering the tank, the exterior cover including an opening section in a portion facing the replenishing port;
an openable cover covering the opening section;
a hinge member provided between a lower end of the openable cover and the exterior cover, the hinge member allowing the openable cover to be rotated, the hinge member including a stopper configured and arranged to contact the opening section when the openable cover is fully opened, the hinge member including a first plate member extending perpendicular to a rotational axis of the openable cover, at least one first recessed section being formed on an upper part of the first plate member when the openable cover is fully opened; and
a placing member provided on an inside surface of the openable cover and extending upward from the inside surface when the openable cover is fully opened,
an upper end of the first plate member and an upper end of the placing member being positioned on a common horizontal plane when the openable cover is fully opened.

10. The work vehicle according to claim 9, wherein
the hinge member further includes a second plate member, at least one second recessed section being formed on the second plate member.

11. The work vehicle according to claim 10, wherein
the second plate member includes a number of the second recessed sections equal to a number of the first recessed sections of the first plate member.

12. The work vehicle according to claim 10, wherein
an upper end of the first plate member and an upper end of the second plate member are positioned on a common horizontal plane when the openable cover is fully opened.

13. The work vehicle according to claim 9, wherein
the placing member is spaced apart from the hinge member in a direction of separating from the opening section when the openable cover is fully opened.

* * * * *